Patented June 11, 1929.

1,716,542

UNITED STATES PATENT OFFICE.

CARLETON ELLIS, OF MONTCLAIR, NEW JERSEY.

PROCESS OF FORMING A KETONE-ALDEHYDE INTERMEDIATE AND RESINOUS COMPLEX.

No Drawing. Application filed March 27, 1922. Serial No. 547,214.

This invention relates to the field of synthetic resins and to intermediates capable of forming synthetic resins suitable for the manufacture of lacquers, varnishes, paint compositions, molded products, insulation and various other bodies or articles.

The invention is especially concerned with the production of an intermediate compound of an organic nature containing a resinophore group, that is a group which is capable of bringing about a resinifying change, such resinophore group being contained in a compound denominated a resinogene. The preferred form of the present invention also is concerned with a resinogene of a water soluble character capable of being diluted with water as a vehicle for application of the resinogene in various ways.

One form of the resinogene (to which the invention is not confined) may be obtained by reacting on a ketone with an aldehyde (preferably both aliphatic) as for example by treating acetone with formaldehyde in the presence of a reagent of an alkaline nature capable of uniting these substances to a compound, polymer or derivative of a complex nature containing the resinophore group. By reacting on acetone or methyl ethyl ketone with formaldehyde in the presence of certain mild alkaline substances a syrupy and water soluble product is obtained which varies in its properties considerably according to the manner of preparation.

Without further elaborating on these properties at this stage I will give a series of examples which will illustrate various forms of the intermediate product or resinogene.

Example 1.

500 grams of aqueous formaldehyde about 37% strength, i. e. containing about 185 grams of real formaldehyde, were mixed with 1500 grams of acetone and a concentrated aqueous solution containing 25 grams of potassium carbonate was added and the mixture heated on a water bath and stirred by means of a mechanical agitator for 3 hours at a temperature between 30 and 40° C. At the end of this time no formaldehyde could be detected by the fuchsine test. The mixture had darkened slightly and increased in viscosity. It was exactly neutralized with dilute hydrochloric acid at which time no separation occurred. The neutral liquid was placed in a shallow pan and dried in a vacuum dryer under a 26 inch vacuum until the temperature reached 60° C. The remaining heavy viscous liquid amounted to 460 grams. This is one example of a "resinogene" as the term is used in this case. This particular heavy liquid is a resinogene. The material was subjected to further treatment as follows. It was placed in a distillation flask and distilled under a vacuum of about 29 inches. The first drop came over at 43° C. and immediately the liquid in the flask started to decompose giving off water and formaldehyde which considerably lowered the vacuum. The distillation was continued until the temperature reached 60° C. This temperature however was very uncertain due to the decomposition which caused both temperature and pressure to vary. The distillation was then stopped, and on cooling some saline matter separated from the liquid. The latter was decanted and amounted to 283 grams. It was oily and light yellow in color and did not feel sticky to the hands. It had a characteristic odor in conjunction with the slight odor of formaldehyde. It was soluble in water and alcohol and somewhat soluble in ether. The oil was not soluble in benzol but appeared to take up some benzol. It was soluble in all proportions in methyl alcohol and in glycerine. At 20° C. its specific gravity was 1.134. If to say 5 c. c. of this material a few drops of alcoholic caustic soda are added and gently heated an immediate reaction occurs with solidification to a resin which reaction is decidedly exothermic. In fact if the test is carried out in a test tube the solidifying material is quite likely to be forcibly ejected from the tube by the violence of the reaction. If a larger quantity of caustic soda is added to the material, cold, the reaction of resinification will take place spontaneously. If this reaction is caused to take place in a closed mold, the reaction heat may carry the temperature of the mass up to a molding heat. In this respect the product illustrated by the present example differs somewhat from others which will be discussed later.

The viscous material may be saturated with ammonia gas which on heating brings about change to a yellow resin. This is fusible and soluble in hot alcohol but insoluble in cold alcohol.

In the foregoing as well as in subsequent reactions which will be described it should be noted that the character of the product depends not only on the catalyzer or activating agent used but on the amount of the latter and on the temperature.

Example 2.

For the purpose of increasing the yield of the water soluble resinogene 1500 grams of aqueous formaldehyde to 1000 grams of acetone were employed. To this mixture 25 grams of potassium carbonate in concentrated aqueous solution was added and the mixture agitated and heated on the water bath to between 30° and 35° C. Reaction occurred and the temperature was kept from rising to an undesirable point by changing the water in the water bath from time to time. The reaction appeared to be in progress for approximately 2 hours and the batch was maintained at the temperature stated for about 5 hours, it was then cooled and allowed to stand over night. In the morning no formaldehyde could be detected by the fuchsine test. The batch was neutralized with dilute hydrochloric acid and dried in a vacuum dryer for about 8 hours under a 27 inch vacuum, the temperature reaching 63° C. 1165 grams of a yellow very viscous product was obtained resembling strained honey.

This product is considerably less reactive than that produced in example 1. On adding caustic soda to the honey-like material no reaction takes place in the cold as in the previous illustration but on heating the exothermic reaction of resinification progresses violently.

Example 3.

In the present example a further increase was made in the amount of formaldehyde, 2500 grams of 37% aqueous formaldehyde being used to 1000 grams of acetone and 25 grams of potassium carbonate in concentrated aqueous solution used as previously. The mixture was agitated in a flask placed on a water bath and the temperature raised to 30° C. The heating was then discontinued and it was found that sufficient heat was generated by the reaction to maintain the batch at a temperature of about 34° C. for 5½ hours. Formaldehyde was still present as shown by the fuchsine test. After reacting for 3 hours longer at 40° to 50° C. only low product, thicker than strained honey and flowing about in a bottle only very slowly. However it was very easily soluble in water in all proportions and when somewhat diluted with water gave a product resembling glycerine and in fact for some purposes apparently serving as a glycerine substitute. This heavy-bodied product was not as reactive as that produced by example 1 but could be very readily resinified by warming with a small amount of caustic potash or caustic soda. The transformation from the water soluble honey-like substance to a water insoluble and in some cases infusible resin was sudden and was strongly exothermic.

Example 4.

Miscellaneous reactions of the foregoing: A sample of the end product obtained according to Example 1 was distilled in a stream of carbon dioxide, distillate started to come over at 90° C. and the temperature gradually rose to 100° C. where it remained during most of the distillation and finally rose to 110° C. The distillate smelled strongly of formaldehyde was colorless and amounted to approximately one-third of the original sample. The residue was a yellow fusible resin, and soluble in hot alcohol and insoluble in cold alcohol. The distillate was treated with ammonia gas when considerable heat was evolved and the sample turned brown but without formation of a precipitate. On re-distilling a colorless distillate was obtained and also a residue which was very dark red. The dark red residue was placed in an oven at 150° C. and at the end of 2 hours was still fusible. It was allowed to remain in the oven at 150° C. for about 2 days and was then found to be thermo-rigid.

Four samples of 10 grams each of the water soluble product obtained according to Example 1 were treated as follows: Caustic soda was added in the ratio of ¼ of 1%, ½ of 1%, ¾ of 1% and 1% respectively and the samples were placed in an oven at a temperature of 150° C. to determine the rate of reaction to produce a thermo-rigid resin. The sample containing ¼ of 1% of caustic soda became turbid and foamy in about 1 hour and in 2 hours and 40 minutes was thermo-rigid. The sample containing ½ of 1% became rubbery in 15 minutes and when examined at the end of 2 hours and 40 minutes was thermo-rigid. The sample containing ¾ of 1% became rubbery in 10 yellow color and the fourth sample was somewhat darker. When the resins were ground and samples placed in test tubes the four products could be placed in correct order according to the amount of caustic alkali used simply by observing the difference in color of the powders.

The reaction product according to example 1 reacts promptly when either aqueous or alcoholic caustic soda is added in considerable quantity. Hydrated lime, barium carbonate and sodium carbonate are much milder in their action.

10 grams of the honey-like substance obtained in Example 2 were treated with 1% of caustic soda and 2% of glycerine. On heating in an oven at 150° C., in comparison with a sample containing the same amount of caustic soda but no glycerine, it was found that the latter sample became thermo-rigid in about 1½ hours while the sample containing glycerine required about 3 hours heating.

3 samples of the honey-like substance prepared according to Example 2 were treated with dry ammonia gas until the gain in weight was 7%, 2% and 1% respectively. The products were heated in thin layers to about 150° C. The sample containing 7% ammonia required 25 minutes to become thermo-rigid, that containing 2% ammonia required 40 minutes and the sample containing 1% of ammonia required 1 hour 10 minutes. All the samples were colored to about the same shade of yellowish brown.

A sample of the honey-like substance saturated with ammonia gas showed very little darkening and little or no increase in viscosity after 5 days at room temperature.

When the material obtained according to Example 1 was ground with a small amount of caustic soda in a mortar, reaction started and a resin was produced which could be ground to a powder.

*Example 5.*

In the following example the result of using a larger quantity of potassium carbonate is indicated. Acetone 1000 grams, 37% aqueous formaldehyde 2500 grams and a concentrated aqueous solution containing 50 grams of potassium carbonate were agitated in a 5 liter flask in a water bath at a temperature starting at 30° C. This temperature was maintained for 4½ hours after which the temperature was raised to between 50° and 55° C., for 2 hours. At this point the composition (liquid of honey-like consistency) was found to be free from formaldehyde by the fuchsine test.

500 grams of this product were neutralized with dilute hydrochloric acid and dried under a vacuum of 27 inches until the temperature reached 80° C. The yield of the dried product from the 500 grams was 210 grams. It was very viscous but soluble in water and was about as reactive as the honey-like substance prepared according to Examples 2 and 3.

Another sample of 500 grams was dried in the same manner without neutralization. The resulting product weighed 225 grams and was more viscous and darker in color than that which had been neutralized. It was soluble in water. When a considerable amount of 40% aqueous caustic soda was added to a portion, reaction took place spontaneously in the cold yielding a resin.

A sample of the thick honey-like substance prepared according to Example 5 was applied (after the manner of applying paint) to a steam radiator used for heating the laboratory. Although the sample was quite viscous the heat of the radiator served to thin down the honey-like material so that it could be readily applied. After a time the coating became sufficiently hard to resist any attempt to scratch it with the thumb nail.

On the addition of aqueous caustic potash to some of the honey-like substance and applying this more strongly alkaline mixture to the radiator as aforesaid the coating quickly became hard and in 1½ hours time would resist all efforts to scratch it with the thumb nail. Moreover it could not be readily removed by treatment with various solvents, alkaline solutions and the like.

*Example 6.*

A series of six samples of the honey-like substance obtained according to Example 3 were treated with various proportions of alcoholic caustic soda of about 13% strength. 10 gram samples were used and 1 c. c., 2 c. c., 3 c. c., 4 c. c., 5 c. c., and 6 c. c., of the alcoholic caustic soda was added. The samples were mixed at room temperature and allowed to stand over night and in the morning it was found that the first sample, that is, containing 1 c. c. of alcoholic soda had reacted with the formation of a small layer of resin at the top. In the second sample a larger amount of resin had formed. In the third sample the tendency was indicated to force a part of the resin out of the test tube. In the fourth, fifth and sixth samples the reaction took place with formation of the greatest amount of resin and with a cast or mold of resin fitting the tube in the form of a block and forced upwardly due probably to gases developed by the reaction. In the fifth and sixth samples the resin was tough and rubbery.

*Example 7.*

In place of acetone, methyl ethyl ketone 1000 grams, aqueous formaldehyde 37% 2500 grams, and potassium carbonate 25 grams, the latter being dissolved in a small amount of water, were mixed and agitated at a temperature of 30 to 40° C. for 2½ hours after which the temperature was raised to between 50 and 60° C. for 1½ hours. The mixture was allowed to stand over night and in the morning a light yellow layer had collected at the top, this product had an odor somewhat resembling certain gasoline products. This material was separated and distilled. The distillation temperature ranged from 63° C. to 150° C., the major portion coming over between 70 and 80°. 500 grams of the remainder of the material was neutralized with dilute hydrochloric acid and was dried in a vacuum of 27½ inches, the temperature ranging from 20° C to 63° C. On opening the dryer a strong odor of formaldehyde was noticed and a dark yellow honey-like product was found in the receptacle the amount of this product being 140 grams. The product was soluble in water, alcohol, acetone and glycerine, partly soluble in ether and insoluble in benzol. It appeared to be slightly less reactive from a resinifying standpoint than the products made from acetone.

Example 8.

A sample of the honey-like substance prepared according to Example 3 was mixed with half its volume of 21% alcoholic caustic potash and was mixed with asbestos flour to form a fairly dry, very slightly plastic mass. This was pressed into a mold and heated gently when solidification took place forming an infusible product.

Example 9.

A heavy duck cloth was impregnated with 350 grams of the honey-like substance obtained in accordance with Example 3. To the latter however 7 grams of caustic soda dissolved in a small amount of alcohol had been added. The cloth was impregnated by the vacuum method. It was then baked for 2 hours at 180° C. On weighing at this stage the amount of resin in the cloth was found to be 42.7%. On pressing sheets of this material together in a hot press a thick layer was obtained.

The foregoing examples relating to the preparation of the honey-like resinogene or resinophoric substance owing to the nature of the alkaline material used and its amount and various other conditions afford a resinogene of a water-soluble nature which is soluble in water in all proportions just as real honey dissolves and like the latter has a color varying from yellow to a product of slightly brown cast. As resinification progresses using this material as a source, and especially when using caustic alkali the color deepens to a yellow or orange which for many purposes is undesirable. In the varnish trade and in certain other markets the value of a resin is based to a considerable extent on its color. For example "window-glass" rosin (i. e. practically water-white in color) is priced far more highly than the dark colored varities. In the present invention it is also an object to produce a light colored resin largely free from the yellow or orange dye or coloring matter which forms during resinification with caustic alkali and also with milder alkalis if present in large amount.

Example 10.

By reacting on acetone with paraform in the presence of trisodium phosphate (especially if the amount of the latter is not too great) a product of the consistency of honey is obtained but instead of having the yellow or brown cast noted with stronger alkalis, the material is water white resembling a highly refined glycerine.

Several products were made in the proportion of 1000 parts of acetone to 600 parts of paraform and with 50, 100 and 150 parts of trisodium phosphate. These mixtures were gently heated and then allowed to react spontaneously. The heating can be to 30° or 40° C., and the mixture can be constantly stirred during reaction. The solution was decanted from any undissolved portion and dried in a vacuum pan at temperatures preferably not over 60° C. affording in the case of the products made with 50 and 100 parts of trisodium phosphate perfectly clear water white syrups while in the case of 150 grams the product was of a light straw color. Portions of these products were heated to 100° C. over night and in the morning the samples containing 50 and 100 grams of trisodium phosphate were found still to be water white but not completely hardened to a firm resin. That containing 150 grams had hardened to a very light yellow resin. Other samples of these three products were heated to 150° C. over night and in the morning all had become converted into practically infusible yellow to orange resin.

It is probable that below a certain concentration of hydroxyl the yellow or orange coloring material does not form if the temperature is kept low enough. Thus instead of using trisodium phosphate a very small proportion of caustic soda or a somewhat larger proportion of carbonate of soda could be used in some cases without detriment to the color. However in the case of the caustic soda this should be an extremely minute proportion.

A portion of the water white honey-like substance prepared as above with 100 parts of trisoduim phosphate was applied as a coating to a sheet of aluminum and was baked at 100° and slightly higher until the coating had hardened to a dense firm lacquer. Aluminum was used as the metal because it shows readily any change in color taking place and the light color of the lacquer thus obtained shows this resin to have advantages over various other lacquering materials.

Lacquers which brush readily may be prepared by diluting the water white honey with alcohol, acetone or other suitable solvent. A paint vehicle can be made in like manner, although the yellow water soluble product may be used in this case for strongly colored paints. For example a paint was made with vermilion pigment, the honey-like material obtained in Example 3 with a small amount of alcoholic potash added to cause resinification. This was of good consistency when applied but when the residue of the paint had stood over night in the container it had solidified to a fairly firm mass. For white paints the water white honey-like substance should be used in preference. Also a small amount of a blue pigment may be added in case any slight tint of yellow appears during the progress of resinification.

*Example 11.*

Cyclohexanone also was found to react with formaldehyde in the presence of an alkali as for example alcoholic caustic soda, forming a resinous compound. Furfural, originally of a light yellow color, when reacted upon with alcoholic caustic soda yields a resinous substance and a red coloring matter having strong tinctorial properties. On the other hand when furfural is treated with alkali in the presence of cyclohexanone the product obtained does not show the same red color and apparently is a result of combination between the hexanone and the furfural.

*Example 12.*

The heat of reaction in resinfication is very violent when a large amount of the alkaline activating agent is used. In one case 20 grams of the water-soluble honey-like material obtained in accordance with Example 3 was treated with 10 c. c. of 40% aqueous caustic soda in a beaker which was immersed in 500 c. c. of water at a temperature of 11° C. Reaction took place spontaneously and the mixture solidified to a hard resin in 20 seconds after the alkali had been added. A thermometer in the mass registered about 85° C. and the temperature of the water rose to 17° C. The sudden rise in 20 seconds from about 11° C. to 85° C. shows the degree of heat evolution. In another case 20 grams of the water-soluble honey-like substance at 17° C. was treated with 10 c. c. of 40% aqueous caustic soda and the temperature jumped in a few seconds to 105° C. In this case the vessel containing the resin was not water jacketed.

What I claim is:—

1. The process of making a substantially water white syrupy body which comprises reacting on acetone with formaldehyde in the presence of trisodium phosphate.

2. The process of making a resinous intermediate which comprises reacting upon a lower aliphatic ketone with a lower aliphatic aldehyde in the presence of an alkali metal phosphate of an alkaline character.

3. The process of making a resinous intermediate which comprises reacting upon a lower aliphatic ketone with a lower aliphatic aldehyde in the presence of trisodium phosphate.

4. The process of making a substantially water white syrupy body which comprises reacting on a lower aliphatic ketone with formaldehyde in the presence of an alkaline phosphate.

5. The process of making a resin which comprises first making a white syrupy body of reacting upon a lower aliphatic ketone with formaldehyde in the presence of a weak alkali, and thereafter acting upon said white syrupy product with an alcoholic solution of a fixed caustic alkali to convert the same into a resin.

CARLETON ELLIS.